United States Patent
Yuen et al.

(10) Patent No.: US 9,361,163 B2
(45) Date of Patent: Jun. 7, 2016

(54) MANAGING CONTAINERIZED APPLICATIONS ON A MOBILE DEVICE WHILE BYPASSING OPERATING SYSTEM IMPLEMENTED INTER PROCESS COMMUNICATION

(71) Applicant: Good Technology Corporation, Sunnyvale, CA (US)

(72) Inventors: Chun Fung Yuen, Mississauga (CA); Alex Lau, Markham (CA)

(73) Assignee: Good Technology Corporation, Sunnyvale, CA (US)

( * ) Notice: Subject to any disclaimer, the term of this patent is extended or adjusted under 35 U.S.C. 154(b) by 180 days.

(21) Appl. No.: 14/093,005

(22) Filed: Nov. 28, 2013

(65) Prior Publication Data

US 2015/0150025 A1    May 28, 2015

(51) Int. Cl.
    *G06F 9/54*    (2006.01)
    *G06F 9/455*   (2006.01)
    *G06F 21/55*   (2013.01)

(52) U.S. Cl.
    CPC ........ *G06F 9/54* (2013.01); *G06F 9/455* (2013.01); *G06F 9/544* (2013.01); *G06F 21/556* (2013.01)

(58) Field of Classification Search
    CPC ........................................................ G06F 21/53
    See application file for complete search history.

(56) References Cited

U.S. PATENT DOCUMENTS

| 2003/0221024 A1 | 11/2003 | Arroyo |
| 2009/0025009 A1 | 1/2009 | Brunswig |
| 2009/0144510 A1* | 6/2009 | Wibling ............... G06F 9/5016 711/147 |
| 2011/0141124 A1* | 6/2011 | Halls .................... G06F 21/57 345/522 |
| 2013/0174154 A1 | 7/2013 | Poore |
| 2013/0239192 A1* | 9/2013 | Linga ................... G06F 21/44 726/7 |

(Continued)

FOREIGN PATENT DOCUMENTS

WO    2006010263 A1    2/2006

OTHER PUBLICATIONS

Bugiel, S.; Davi, L.; Dmitrienko, A.; Heuser, S.; Sadeghi, A.; Shastry, B., "Practical and lightweight domain isolation on Android" (2011), Proceedings of the 1st ACM workshop on Security and privacy in smartphones and mobile devices (SPSM '11), pp. 51-62 [retrieved from http://dl.acm.org/citation.cfm?id=2046624].*

(Continued)

*Primary Examiner* — Brian W Wathen
(74) *Attorney, Agent, or Firm* — Fish & Richardson P.C.

(57) ABSTRACT

A method of on-device access using a container application to manage a sub application provisioned on a computer device by set of stored instructions executed by a computer processor to implement the steps of: receive a communication for the sub application by a first service programming interface (SPI) of the container application, the communication sent by a on-device process over a first communication pathway of a device infrastructure of the computer device utilizing inter-process communication (IPC) framework of the device infrastructure, the first communication pathway provided external to the first SPI; retransmit the communication by the first SPI to a second SPI of the sub application over a second communication pathway that bypasses the IPC framework, the second communication pathway internal to the first SPI; receiving a response to the communication by the first SPU from the second SPI over the second communication pathway; and directing the response to the on-device process over the first communication pathway.

13 Claims, 3 Drawing Sheets

(56) References Cited

U.S. PATENT DOCUMENTS

| | | | |
|---|---|---|---|
| 2014/0068779 A1* | 3/2014 | Tan | G06F 21/606 726/26 |
| 2014/0137184 A1* | 5/2014 | Russello | G06F 21/60 726/1 |
| 2014/0181896 A1* | 6/2014 | Yablokov | H04L 63/10 726/1 |

OTHER PUBLICATIONS

Xu, R.; Saidi, H.; Anderson, R., "Aurasium: Practical Policy Enforcement for Andriod Applications" (Aug. 8-10, 2012), 21st Usenix Security Symposium, pp. 1-14 [retrieved from https://www.usenix.org/system/files/conference/usenixsecurity12/sec12-final60.pdf].*

Burns, J., "Mobile Application Security on Android" (2009), Black Hat USA 2009, pp. 1-27 [retrieved from http://www.blackhat.com/presentations/bh-usa-09/BURNS/BHUSA09-Burns-AndroidSurgery-PAPER.pdf].*

Gray, J., "Interprocess Communications in Linux" (2003), Person Education Inc., pp. 165-193.*

International Search Report issued on Feb. 20, 2015 for related Application No. PCT/US2014/067694 filed Nov. 26, 2014 and published as WO/2015/081249 on Jun. 4, 2015.

* cited by examiner

MANAGING CONTAINERIZED APPLICATIONS ON A MOBILE DEVICE WHILE BYPASSING OPERATING SYSTEM IMPLEMENTED INTER PROCESS COMMUNICATION

FIELD

The present invention relates to mobile application management.

BACKGROUND

Exploitation of computing devices is an ever increasing problem in today's mobile workforce environment. Bring-your-own-device (BYOD) trends are accelerating in today's everything-mobile environment. One disadvantage for today's users is that they have to carry multiple devices to stay connected to every aspect of their lives. The advent of consumerization has led employees to demand a greater say in the devices, applications and carriers they use at work. They either tend to regard company-issued mobile phones as their own, or they are looking to bring personal devices into the workplace to help them manage their day—but few are prepared to juggle two separate handsets nowadays. IT departments are struggling to react to the pace of change that these new types of hardware and operating systems pose in the enterprise environment. Data security is a particular concern as currently devices are used interchangeably for private and professional purposes, without proper restrictions placed on data access both on and off the device. At the moment, the frontier between personal and business devices is blurred, while smart phones are increasingly used for work purposes.

More specifically, a growing number of employees are already using their own phones for work-related activities. According to Forrester, 60% of companies now allow their employees to use personal smart phones and tablets at work a trend known as BYOD—'Bring Your Own Device'. However, using the same device for work and private purposes may be problematic. For instance, using your business phone to store your personal contacts means that these may end up in the company's backup base, raising privacy concerns. Further, having company data on a personal device raises the likelihood that dissemination of the company data outside of company communication channels may occur.

Today's MDM/MAM solutions is drastically complicated by an increasing demand by users to BYOD. On one hand enterprises need to ensure that data are secured and under the control of the enterprise, but on the other hand the user wants to retain control of device data that are personal in nature. This see-saw battle gave rise to recent technological advances in the area of applying MAM to applications, often termed "containerization" or "sandboxing".

However, a major challenge in applying MAM to a "container" revolves around the interaction between applications and the IPC subsystem of the mobile device platform. Ideally only interfaces that are 1. crucial to the functionality of application 2. necessary for MAM should be exposed via inter process communication (IPC). These two requirements however, poses serious challenges and security risks. For example, allowing applications to expose application interfaces via IPC introduces an attack vector where intruders can invoke the application interfaces for malicious purposes, possibly result in data leakage. The MAM component could theoretically intercept the calls at the IPC level, but this often requires direct hooks into the mobile platform which might not always be desired. Alternatively completely disabling the application interfaces of applications is not practical either some of them are crucial to the functionality of the application (e.g. Android component's lifecycle events are invoked by the Android Binder IPC subsystem). Another example is where application interfaces that supports MAM are often extremely powerful (eg. Deletes data, lock application). Exposing these application interfaces via IPC poses an extreme risk where a malicious application can invoke resulting in possible data loss.

SUMMARY

It is an object of the present invention to provide communication management between applications on a mobile device to obviate or mitigate at least one of the above-presented disadvantages.

Data security is a particular concern as currently devices are used interchangeably for private and professional purposes, without proper restrictions placed on data access both on and off the device. At the moment, the frontier between personal and business devices is blurred, while smart phones are increasingly used for work purposes. Contrary to present on-device security systems there is provided a method of on-device access using a container application to manage a sub application provisioned on a computer device by a set of stored instructions executed by a computer processor to implement the steps of: receive a communication for the sub application by a first service programming interface (SPI) of the container application, the communication sent by an on-device process over a first communication pathway of a device infrastructure of the computer device utilizing an interprocess communication (IPC) framework of the device infrastructure, the first communication pathway provided external to the first SPI; retransmit the communication by the first SPI to a second SPI of the sub application over a second communication pathway that bypasses the IPC framework, the second communication pathway internal to the first SPI; receive a response to the communication by the first SPI from the second SPI over the second communication pathway; and directing the response to the on-device process over the first communication pathway.

A first aspect provided is a method of on-device access using a container application to manage a sub application provisioned on a computer device by set of stored instructions executed by a computer processor to implement the steps of: receive a communication for the sub application by a first service programming interface (SPI) of the container application, the communication sent by a on-device process over a first communication pathway of a device infrastructure of the computer device utilizing interprocess communication (IPC) framework of the device infrastructure, the first communication pathway provided external to the first SPI; retransmit the communication by the first SPI to a second SPI of the sub application over a second communication pathway that bypasses the IPC framework, the second communication pathway internal to the first SPI; receive a response to the communication by the first SPU from the second SPI over the second communication pathway; and direct the response to the on-device process over the first communication pathway.

BRIEF DESCRIPTION OF THE DRAWINGS

The foregoing and other aspects will be more readily appreciated having reference to the drawings, wherein.

DESCRIPTION

The claimed invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the claimed invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the claimed invention is provided below along with accompanying figures that illustrate the principles of the invention. The claimed invention is described in connection with such embodiments, but the claimed invention is not limited to any embodiment. The scope of the claimed invention is limited only by the claims and the claimed invention encompasses numerous alternatives, modifications and equivalents. Numerous specific details are set forth in the following description in order to provide a thorough understanding of the claimed invention. These details are provided for the purpose of example and the invention may be practiced according to the claims without some or all of these specific details. For the purpose of clarity, technical material that is known in the technical fields related to the claimed invention has not been described in detail so that the claimed invention is not unnecessarily obscured.

In this specification and in the claims, the use of the article "a", "an", or "the" in reference to an item is not intended to exclude the possibility of including a plurality of the item in some embodiments. It will be apparent to one skilled in the art in at least some instances in this specification and the attached claims that it would be possible to include a plurality of the item in at least some embodiments.

Figure 1:
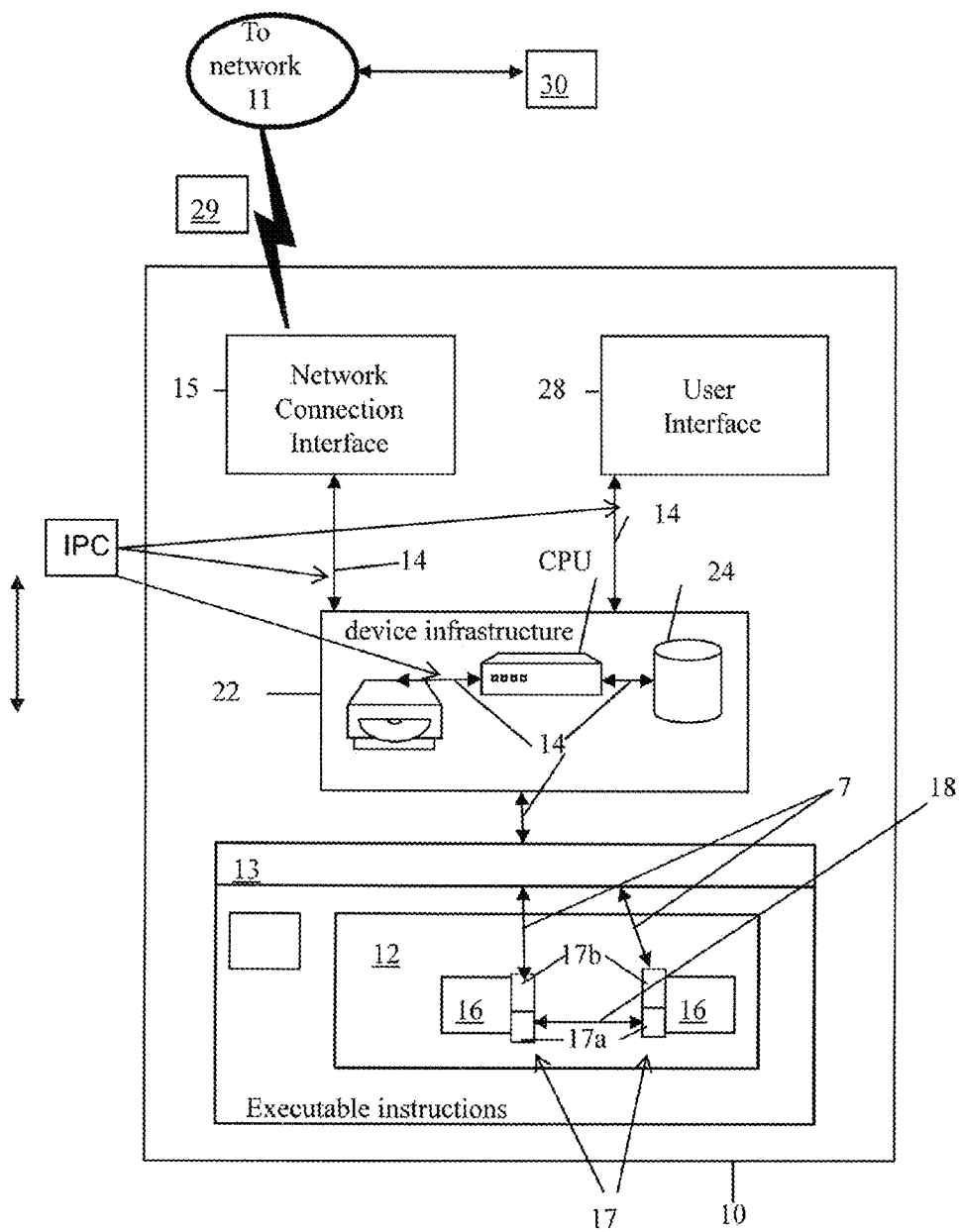
FIG. 1 shows an example configuration of a device.

Referring to FIG. 1, the following relates to a system for management of containerized applications 16 provisioned on a computer device 10 (e.g. mobile device) through usage of a container application 12, such that a set of containerized applications 16 (also referred to as sub-applications) are managed by the container application 12. The container application 12 provides for intercommunication (e.g. communication request-and-response pairs) between containerized applications 16 while at the same time restricting access of the containerized applications 16 to inter-process communication (IPC) functionality provided by the computer device infrastructure 22 (also referred to as computer device platform or computer device IPC framework). It is recognized that the container application 12 also provides for limited and controlled access by the containerized applications 16 to computer device IPC framework 22, such that respective service programming interfaces 17 (see FIG. 3) of each of the containerized applications 16 communicate with the computer device IPC framework 22 via an intervening or intermediate service programming interface 13 of the container application 12.

A client (or consumer) application 12, 16 is an application or a process that requests a service from some other application or process. A service application 12, 16 is an application or a process that responds to a client (or consumer) application 12, 16 request. Many applications 12, 16 can act as both a client (or consumer) and a service, depending on the situation. As such, intercommunication between the applications 12, 16 and/or between the applications 12 and the on-board devices (e.g. user interface 28) is performed via communicating respective service programming interfaces 13, 17.

In one example, the service programming interface 17 of each containerized application 16 has a first interface portion 17a dedicated for facilitating direct communication between containerized applications 16 (i.e. between respective service programming interfaces 17 of containerized applications 16 in contact with one another), such that the communication path 18 of the inter containerized application communications bypasses the inter process communication (IPC) path 14 provided by an operating system of the mobile device platform 22 and is such logically positioned behind the service programming interface 13. A second interface portion 17b of the service programming interface 17 is dedicated for facilitating communication (e.g. communication request-and-response pairs) between the containerized applications 16 and the IPC paths 14 of the mobile device platform 22, as first received and then retransmitted via the intermediate service programming interface 13 of the container applications 12.

It is recognized in the above service programming interface 13, 17 example configuration, the communication pathways 14 in front of the service programming interface 13 and communication pathways 18 behind the service programming interface 13 are all performed using computer hardware (e.g. short term memory 24 such as memory buffers, longer term memory such as drive memory, etc.) considered on-board the computer device 10. As such, any communications 29 communicated between the network interface 15 (e.g. USB port or other communication channel) and any connected device 30 on the network 11 are considered communications that occur off device and as such are not considered to be communications communicated via pathways 14 that are provided on device by the device infrastructure 22. In other words, communications are not considered to be on the pathways 14 provided by the device infrastructure 22 until the communications are received by the network connection interface 15 and then retransmitted locally on-device using physical and/or logical connections provided by pathways 14 between device components (e.g. network interface 15, user interface 28, general memory 24) and container applications 16.

Communications (e.g. communication request-and-response pairs) in general (e.g. on pathways 18) can refer to accessing Data at Rest (DAR) referring to inactive data which is stored physically in any digital form on the computer device 10, for example associated with a particular containerized application 16. Other communications types can be Data in Use or Data in Transit (DIT). DAR can be defined as archive data (i.e. which never changes), regardless of its storage medium, is Data at Rest and active data subject to constant or frequent change is Data in Use, "inactive data" could be taken to mean data which may change, but infrequently. The imprecise nature of terms such as "constant" and "frequent" means that some stored data cannot be comprehensively defined as either Data at Rest or Data in Use. Data in use can be referred to as a data security term that refers to data that is in the process of being created, retrieved, updated, deleted, and/or otherwise manipulated. Data in use is all data not in an at-rest state and that resides on or otherwise in process with respect to one or more devices and/or applications (e.g. container applications 12) of the device infrastructure 22. Data in use can be one aspect of a Data Loss Prevention (DLP) system. Such data can be regarded as secure if and only if access to the memory is controlled and, regardless of how the process terminates, the data cannot be retrieved from any location other than the original at-rest state, requiring re-authorization. It is recognized that DAT or DIT can refer to data being communicated/accessed via pathways 14 and/or via pathways 18.

Referring to FIG. 1, Data At Rest components 32 and one or more Data in Transit components 34 can be stored on or otherwise accessed with respect to the storage 24. In one example embodiment, component 34 and 32 (DAR and DIT), which is depicted as associated with one or more container applications 12, is accessible by the containerized applications 16 associated with their host container application 12. For example, the components 34 can be a (e.g. Java) library implementation that's shared across containerized applications 16 within a container application 12 and as such the library associated as the components 34 can be owned by the respective container application 12 hosting the containerized applications 16. Further, component 32 can be a virtualized file system that's physically a single file system stored in memory 24 but virtualized in such a way that each containerized application 16 sees the single file system as individual file systems pertaining to each respective containerized application 16 as part of the single file system associated and accessible by the respective host container application 12. With this example architecture of library implementation and single file system, the Policy Engine 36 contained in the host container application 16 can short-circuit the data management of components 34, 32 (for example wipe data command, lock data command, etc.) without going through the containerized applications 16.

The library implementation can be defined as a set of dynamically loadable libraries (e.g. Java Class Library (JCL)) that containerized applications 16 can call at run time. In terms of Java example, because the Java Platform is not dependent on a specific operating system, containerized applications 16 cannot rely on any of the platform-native libraries. Instead, the library implementation (e.g. Java Platform) can provide a comprehensive set of standard class libraries, containing the data access functions common to modern operating systems. The standard code libraries implementation (as an embodiment of the containerized applications 16), provides to the containerized applications 16 data 32,34 access facilities organized by, classes and regular expression processing.

The library implementation provides an abstract data 32,34 management interface for data manipulation, such as file access in the memory 22. Dynamic linking or late binding of the libraries can refer to linking performed while a containerized application 16 is being loaded (load time) or executed (run time) via the host container application 12, rather than when the executable library file associated with the containerized application 16 is created. A dynamically linked library (dynamic-link library or DLL under Windows and OS/2; dynamic shared object or DSO under Unix-like systems) is a library intended for dynamic linking.

Communications pathways 14, 18 (i.e. electronic pathways physically and/or logically defined) can be implemented on one or more configured BUSes of the device infrastructure 22. For example, BUS can be defined as a communication system that transfers data (e.g. communication request-and-response pairs) between components (e.g. hardware components 15,28, software components 12, 16, etc.) inside the computer device 10. This expression can include all related hardware components (wire, circuits, etc.) and software, including communication protocol. The term BUS can encompass any physical arrangement that provides the same logical functionality as a parallel electrical bus, such as buses using parallel and/or bit serial connections, wired in either a multi-drop (electrical parallel) or daisy chain topology, or connected by switched connections (e.g. USB). For example, the BUS connecting the CPU and memory 24 can be one of the defining characteristics of the system, and referred to simply as the system BUS. The internal BUS, also known as internal data BUS, memory BUS, system BUS or front-Side-BUS, connects all the internal components of the computer device infrastructure 22, such as CPU and memory 24, to the motherboard. Internal data BUSes are also referred to as a local BUS, because they are intended to connect to local on-board devices. This BUS is typically faster that traditional Buses for data transfer rates and can be independent of the rest of the computer operations. Another type of BUS as defined can be a cache providing accommodation of the performance difference between the CPU and main memory. The cache represents a BUS providing for amounts of high-speed memory built directly into the CPU.

Further, to provide modularity, memory and I/O BUSes can be combined into a unified system BUS. In this case, a single mechanical and electrical pathways 14, 18 system can be used to connect together many of the computer device 10 device components/applications, or in some cases, all of them. As such, communication signals between components (e.g. user interface 28, memory 24, etc.) between components and applications 12 (e.g. between applications 12, between application 12 and user interface 28, between application 12 and network interface 15, etc.) provide for natural flow of the data/messages/command via communications transmitted/received through the BUS in physical and/or logical order in any of the defined pathways 14, 18.

Further, communications on pathways 18 behind the service programming interface 13, involving data (DAT, DIT), can be encrypted when communicated between containerized applications 16. However, preferably, communications (e.g. communication request-and-response pairs) on pathways 18 behind the service programming interface 13 involving data (DAT, DIT) can be unencrypted when communicated between containerized applications 16, thus providing for processor speed efficiencies and overhead as compared to encrypted data. For example, communications between containerized applications 16 using first interface portions 17a would be transmitted in unencrypted form.

In terms of communications (e.g. communication request-and-response pairs) on pathways 14 outside of the service programming interface 13, involving data (DAT, DIT), these can be encrypted when communicated between container applications 16 and/or between container applications and on-beard devices (e.g. user interface 28). For example, communications between containerized application 16 and container application 12 using second interface portions 17b and service programming interface 13 would be transmitted in unencrypted form, as received by or otherwise transmitted from the service programming interface 13 with respect to the using second interface portions 17b of the containerized applications 16. However, any communications as received by the service programming interface 13 via pathways 14 would be in encrypted form and then could be transformed into unencrypted form before being retransmitted to target containerized application(s) 16 using second interface portions 17b and service programming interface 13. Further, any communications as received by the service programming interface 13 via pathways 18 (originating from second interface portion(s) 17b of containerized applications 16) would be in unencrypted form and then could be transformed into encrypted form before being retransmitted to target container application(s) 16 and/or on-board devices using service programming interface 13 on pathways 14 of the device infrastructure 22.

In terms of cryptography, encryption can be performed by the container application 16 (e.g. via service programming interface 13) by encoding messages (or information) of the communications in such a way that unauthorized application/device using or otherwise part of the device infrastructure 22 (e.g. personal unsecured application 20 outside of any service programming interface 13 of the container applications 12) cannot read it, but that authorized applications/devices (e.g. on board device 15) can. In an encryption scheme, the message or information of the communication (e.g. referred to as plaintext) is encrypted using an encryption algorithm, turning it into an unreadable ciphertext, or vice versa in the case of a received ciphertext communication. This encryption process can be performed with the use of an encryption key, which specifies how the message/data is to be encoded. Any unauthorized application/device that can see/access the ciphertext via the device infrastructure 22 and outside of the service programming interface 13 should not be able to determine anything about the original message/data. An authorized application/device using the device infrastructure 22, however, is able to decode the ciphertext using a decryption algorithm, that usually requires a secret decryption key, that unauthorized application/device do not have access to. The encryption scheme can use a key-generation algorithm to randomly produce the keys. For example, there are two basic types of encryption schemes: symmetric-key and public-key encryption. In symmetric-key schemes, the encryption and decryption keys are the same. Thus communicating applications/devices using the device infrastructure 22 agree on a secret key before they wish to communicate. In public-key schemes, the encryption key is published for any applications/devices using the device infrastructure 22 to use and encrypt messages. However, only the receiving party has access to the decryption key and is capable of reading the encrypted messages.

Example Service Programming Interface (IPC) Configuration

Service programming interfaces 13, 17 can be defined as enabling an application (e.g. container application 12, containerized application 16 to make some and/or all of its functionality available to other applications resident on the computer device 10, for example as expressed by methods for message passing, synchronization, shared memory, and/or remote procedure calls (RPC) between applications 12, 16, and/or between applications 12 and on-board devices (e.g. user interface 28). This functionality needs to be accessible to various types of applications 12, 16, so interoperability is a key aspect of the configuration of the service programming interfaces 13, 17. In addition to interoperability, service programming interfaces 13, 17 can also support different types of communications protocols (with or without encryption schemes dependent on data type, location and/or target application/device) and accommodate varying operational requirements. As such, the service programming interfaces 13, 17 can be defined as part of the application 12, 16 that makes pieces of the application's functionality available to other applications, while ensuring that the interface mechanics are decoupled from the application logic.

For example, the service programming interfaces 13, 17 can impose different operational requirements for communications directed to and/or received by different applications 12, 16. For example, the application 12, 16 may have security requirements that authorize certain applications 12, 16 to perform update and delete operations, while other applications 12, 16 are only authorized to perform read-only operations. Or, for example, different applications 12, 16 may need differing transactional support for communications to or from the service programming interfaces 13, 17. To some application 12, 16 clients, the context in which specific transactions occur may not be important while other application clients may need precise control of the transactional context of the communication(s). A handle to this context might then be passed to other elements of the application as needed.

As such, the service programming interface 13, 17 can be defined as a discrete unit of application 12, 16 logic that exposes a message-based interface that is suitable for being accessed by other applications 12, 16, such that the service programming interface 13, 17 presents the functionality of the application 12, 16 to other consumer/client applications 12, 16. This service programming interface 13, 17 defines and implements a contract between the consumers application 12, 16 of the service/data provided by the provider application 12, 16 of the service/data involved in the communication(s) on the pathways 14, 18. This contract and its associated implementation can also be referred to as a service programming interface 13, 17.

As discussed above, the service programming interface 13, 17 provides an entry point that consumer applications 12, 16 can use to access the functionality exposed by the provider application 12, 16. The service programming interface 13, 17 can usually be addressable on the respective pathways 14, 18 provided by the device infrastructure 22 of the computer device 10, i.e. those pathways 14 outside of service programming interface 13 and those pathways inside of a respective service programming interface 13. This means that the service programming interface 13, 17 is capable of being accessed by the consumer applications 12, 16 over some sort of device BUS and/or memory sharing/addressing scheme.

One aspect of the service programming interface 13, 17 is to decouple the implementation needed to communicate with other consumer applications 12, 16 from the provider application's 12, 16 business logic. The service programming interface 13, 17 provides a more coarse-grained communication interface while preserving the semantics and finer granularity of the application logic. The service programming interface 13, 17 also provides a barrier that enables the application 12, 16 logic to change without affecting the consumers of the service programming interface 13, 17. The service programming interface 13, 17 implements the contract between the consumer applications 12, 16 and provider applications 12, 16, in data processing related to generation and transmission of communications as well as in receipt of consumption of communications. This contract allows the applications 12, 16 to exchange information even if they are on different systems (e.g. inside or outside of the service programming interface 13). The service programming interface 13, 17 can also be configured for all of the implementation details needed to perform this communication. Such details include but are not limited to BUS protocol. The service programming interface 13, 17 could encapsulate all aspects of the BUS protocol used for communication between the consumer application 12, 16 and service application 12, 16. For example, suppose that a service application 12, 16 is exposed to consumer application 12, 16 through pathways 14, 18. The service programming interface 13, 17 of the service application 12, 16 receives the request communication, extracts the information needed by the service application 12, 16 to process the request, invokes the appropriate service application 12, 16 functionality, packages the service application 12, 16 response, and sends the response back to the consumer application 12, 16 as a response communication over the appropriate pathway 14, 18. From the service perspective, the only component that understands BUS is the service programming interface 13, 17. The service application 12, 16 implementation has its own contract with the respective service programming interface 13, 17 and could have no dependencies on the specifics of the parameters (e.g. security controls such as authorized or unauthorized access, etc.) that consumer applications 12, 16 use to communicate with the service programming interface 13, 17.

Further, the service programming interface 13, 17 can translate between consumer application 12, 16 data formats and the data formats that the service application 12, 16 expects. The service programming interface 13, 17 can transform and map both data formats in a format that the receiving service application 12, 16 can use. The service application 12, 16 implementation does not need to have any knowledge of the specific data formats the service programming interface 13, 17 might use to communicate with the consumer applications 12, 16 via their respective service programming interface 13, 17.

Further, the service programming interface 13, 17 can implement security parameters of the communications on the pathways 14, 18. The service programming interface 13, 17 could be considered its own trust boundary. Different consumer applications 12, 16 may have different security requirements, so it is up to the service programming interface 13, 17 to implement these consumer application 12, 16-specific requirements. For instance, consumer application 12 providing communications on pathways 14 external to the service programming interfaces 13 can have more restrictive security requirements than consumer application 16 internal to the service programming interfaces 13 for communications on pathways 18. External consumer application 12 can have strong authentication requirements and can only be authorized to perform a very limited subset of the operations authorized. Internal consumer application 16 can be implicitly trusted for most operations and only require authorization for the most sensitive operations.

Further, the service programming interface 13, 17 can implement service level agreements. The service programming interface 13, 17 can have a role in providing that the service meets its service level commitments to a specific set of consumer applications 12, 16. Service programming interface 13, 17 can implement caching to increase response time and reduce bandwidth consumption.

It is recognized in the above that where service application 12 is used, this could be exchanged with an on-board device (e.g. network interface 15) providing the communication via pathways 14 to a consumer application 12.

IPC Messaging Example Configuration

Figure 2:
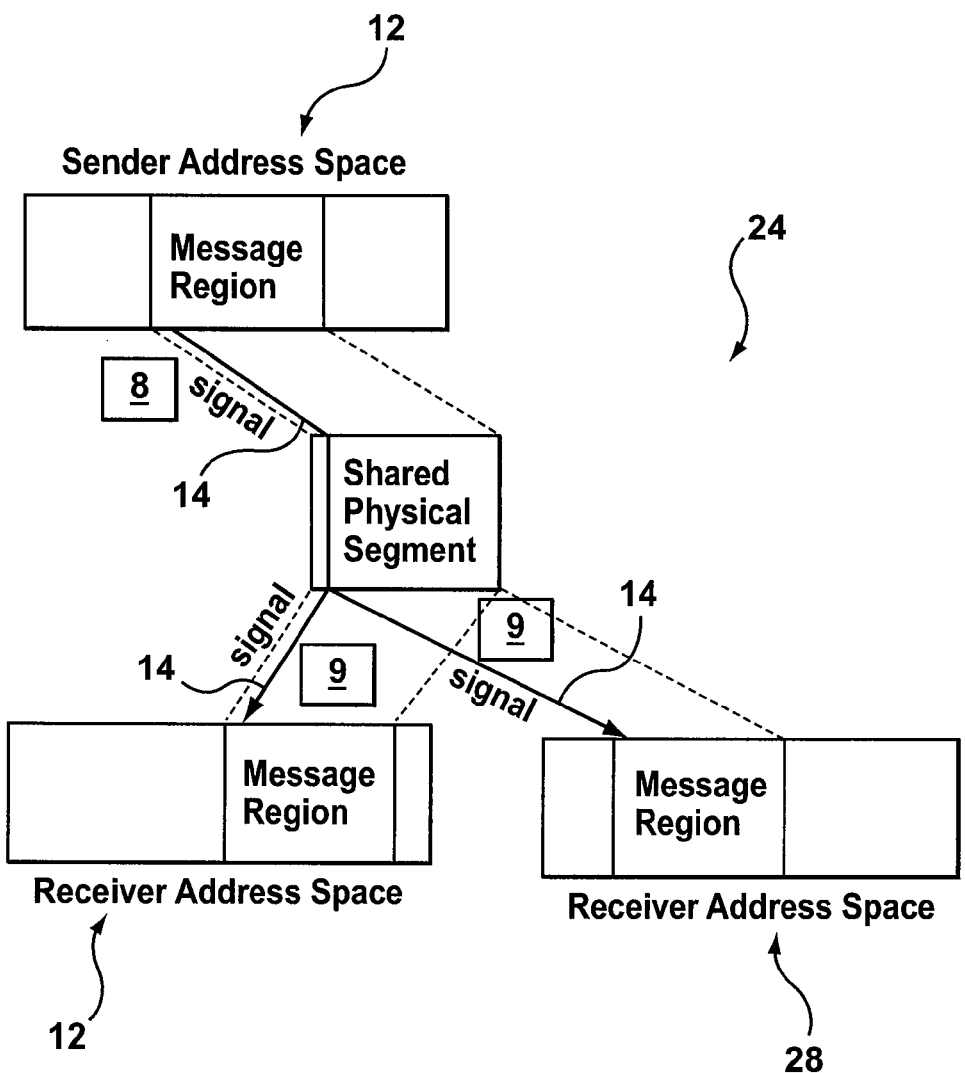
FIG. 2 shows an example configuration of IPC communication of the device of FIG. 1.

Referring to FIG. 2, shown is an example IPC setup for providing inter process (for individual container applications 12 with one another, other provisioned applications on the device infrastructure 22, and other on-board devices—e.g. memory 24, peripherals of network interface 15, user interface 28, etc.) and hardware device communication as a caching model by implementing it as an extension of the virtual memory system of the device infrastructure 22 using memory-based messaging via the pathways 14. It is also recognized that the IPC setup for providing inter process and hardware device communication can also be used by applications provisionsed in the computer device infrastructure 22 that are other than the container applications 12 and respective containerized applications 16. With memory-based messaging, threads 8,9 (e.g. messages involving transfer of data between containers 12 and/or between containers 12 and other on-board devices such as the user interface 28) connected with container applications 12 communicate through the memory system 24 via pathways 14 by mapping a shared region of physical memory of the memory system 24 into the sender and receiver address spaces of the memory system 24.

In operation, the sending thread 8 writes a message into this shared region and then delivers the address of the new message to the receiving threads 9 as an address-valued signal. That is, the virtual address corresponding to the location of the new message is passed to the receiving threads' 9 signal function, translated from the virtual address of the sending thread 8 (e.g. using a normal inverted page table support). On receiving the address-valued signal, the receiving thread 9 reads the message at the designated location in the virtual memory region. While the thread 9 is running in its signal function, additional signals are queued within the Cache (e.g. memory stack of queue such as FIFO). In other words, threading 8, 9 provides for the transmit of a packet with the signal address indicating the packet buffer to transmit. On reception, a signal is generated to the receiving thread 9 with the signal address indicating the buffer holding the new packet. This thread 9 can demultiplex the data to the appropriate input stream for the target application 16.

To support memory-based messaging, messaging can be used to optionally specify a signal thread and also to specify that communication is in message mode. An application 12 interested in receiving signals from a given application 12 (or on-board device) specifies a signal thread 9 in the mapping between applications 12, devices 15,28, etc. (see FIG. 1). The signaling can use the same mapping data structures as the rest of the virtual memory system. As such, data transfer aspects of inter process communication (IPC) on the pathways 14 can be performed directly through the memory system 24, and thus is independent and separate from the data transfer (and other communication types) implemented on the pathways 18 for containerized applications 16 that reside behind the service programming interface 13 of the container application. It is recognized that communication on the pathways 14 is performed with respect to the memory system 24 also made available to all other applications 12 and other devices of the device infrastructure 22 (e.g. devices 15,28), which is by definition not made directly available to the containerized applications 16 which used pathways 18 via dedicated first interface portion 17a. Examples of communication for threads 8,9 on pathways 14 can include data processing functions such as but not limited to copying, queuing and delivering messages.

It is also recognized that the threads 8, 9 could be used to implement object-oriented RPC (Remote Procedural Call) via the procedural communication interfaces 13 to services via the pathways 14. For instance, object writeback can use a writeback channel implementing the threading 8, 9. This implementation provides application 16 control over communication resource management and exception handling, by, for example, overriding functions in the communication library available via the pathways 14 of the device infrastructure 22 that are external to the service programming interface 13. As such, it is recognized that the communications between containerized applications 16 use the service programming interfaces 17 that are configured as internal to the service programming interface 13. Thus any communications 7 via the service programming interfaces 17 (e.g. via second interface portion 17b), directed outside of the container environment provided by the respective container application 16, must be received and then retransmitted by the service programming interface 13 of the respective container application 16 before being transmitted on the pathways 14 of the device infrastructure 22. Further, any communications stemming from the environment outside of the container application 12, for example the user interface 28 to be received via the service programming interfaces 17 (e.g. via second interface portion 17b), would be received on pathways 14 of the device infrastructure 22 and then retransmitted by the service programming interface 13 of the respective container application 16 before being transmitted on the pathways 18 that reside behind the service programming interface 12 (i.e. in the container application 16 environment.

As discussed above in the context of regular IPC communication on pathways 14 outside of the container application 12, communications directly between containerized applications 16 on pathways 18 are considered to be defined as behind or inside of the service programming interface 13. This is contrasted with communication on pathways 14 outside of the container application 12 (e.g. between container applications 16 and/or between container applications 16 and other on-board devices 15,28 via BUS of device infrastructure 22), which are considered to be defined as in-front of or outside of the service programming interface 13.

In general, inter-process communication (IPC) on pathways 14 can be defined as a set of methods for the exchange of data among multiple threads in one or more processes. Processes may be running the device infrastructure 22. IPC methods can be divided into methods for message passing, synchronization, shared memory, and remote procedure calls (RPC). The method of IPC used can vary based on the bandwidth and latency of communication between the threads, and the type of data being communicated. There can be several reasons for providing an environment that allows process cooperation on the pathways 14, namely: Information sharing; Computational speedup; Modularity; Convenience; and/o privilege separation.

Examples of IPC methods can include, as implemented by the operating system of the device infrastructure 22: File—a record stored on memory 24 that can be accessed by name by any process; Signal—a system message sent from one process to another, not usually used to store information but instead give commands; Socket—a data stream sent/received with respect a network interface 15, either to a different process on the same computer device 10 or to another computer via the network 11; Message queue—an anonymous data stream similar to a pipe, but stores and retrieves information in packets; Pipe—a two-way data stream interfaced through standard input and output and is read character by character; Named pipe—a pipe implemented through a file on the file system instead of standard input and output; Semaphore—a simple structure that synchronizes threads or processes acting on shared resources; Shared memory—multiple processes given access to the same memory address 24, allowing all processes involved to change it and read changes made by other processes; Message passing (shared nothing)—similar to the message; and/or Memory-mapped file—a file mapped to RAM memory 24 and can be modified by changing memory addresses directly instead of outputting to a stream, shares same benefits as a standard file.

Example Container Application 12 Configuration

Figure 3:
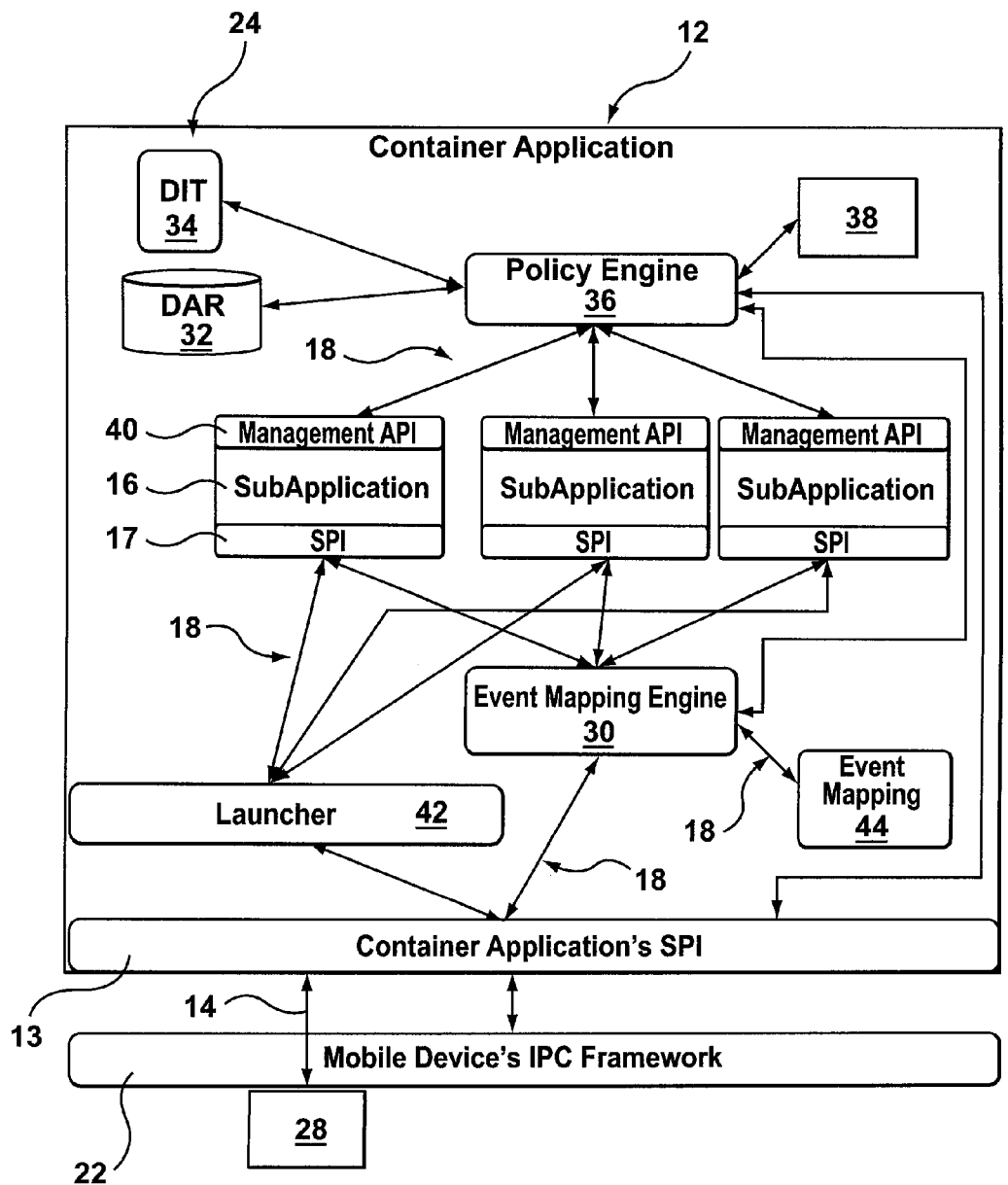
FIG. 3 shows an example configuration of a container application of the device of FIG. 1.

Referring to FIGS. 1 and 3, as discussed above, provided is a system and method to manage a subset of containerized applications 16 on the mobile device 10 without the need for IPC (i.e. providing for bypassing of using pathways 14 while at the same time providing for containerized application 16 intercommunication—via pathways 18). This system provides for the container application 12 (for example as part of a mobile application management (MAM) system) implemented on the mobile device infrastructure 22 to manage the containerized applications 16 without the need for IPC communication on the pathways 14 during this management. It further allows for selectively exposing a subset service programming interface 17 for each containerized application 16, defined by a set of prescribed policies so that the containerized applications 16 can function in a secured state (e.g. secure enterprise environment) while having the guarantees set forth by the enforced policies. As an example, the container application 12 and associated components (e.g. containerized applications 16, policy engine 36, mapping engine 30 and/or launcher 42) can be provisioned on the device infrastructure 22 memory 24 as one address space. The provision of one address space can also be referred to as a sandbox. The term "sandbox" can also be applied in computing as an indefinite isolation area of the memory 24 (e.g. directory path).

Referring to FIG. 3, shown is an example of the container application 12 (a mobile device application provisioned in the computing device 10) including a Policy Engine, one or more associated containerized applications 16 (e.g. sub applications referring to a self contained mobile application that is be placed under the direct control of the container application 12 policies 38), an Event Transformation or Mapping Engine 30 and a service programming interface 13. As such, the service programming interfaces 17 of the containerized applications 16 are directly coupled to the service programming interface 13 and therefore indirectly coupled to the IPC device infrastructure 22 only via the service programming interface 13 of the host container application 16. As such, the container controls access and/or content of communications between the IPC device infrastructure 22 and the service programming interfaces 17. The container application 12 can be considered a mobile application management (MAM) component provisioned on the device infrastructure 22 and can consist of, depending on the particular mobile application platform 22 configuration, one or more [Data At Rest] components 32, one or more [Data in Transit] components 34 stored on or with respect to the storage 24; a Policy Engine 36 configured as a component of the container application 12 that applies application management policies 38 to the containerized applications 16 using a set of management APIs 40. The Policy Engine 36 can accept commands from a remote mobile device management (MDM) server (not shown) via the network interface 15 (of the device infrastructure 22) in communication with the service programming interface 13. In terms of the management APIs 40, these are a communication interface defined between the containerized applications 16 and the policy engine 36, such that the policy engine 36 can implement selected policies 38 via direct invocation using method calls as recognized by the management APIs 40.

As such, the set of management API's 40 implemented by each containerized application 16 provides for the policy engine 36 to control the behavior of the containerized application 16. It is recognized that the management API 40 is separate from and therefore not implemented via IPC pathways 14. Rather, the management API 40 sits behind the service programming interface 17 of the container application 16 and is preferably configured to communicate directly with the policy engine 36. In other words, any process/application communication with the management API 40 of the container application 16, for those applications/processes located outside of the service programming interface 17 must first communicate with the service programming interface 17, which receives the communication from the external application/process (via pathway 14) and then retransmits the communication inside of the service programming interface 17 using pathway(s) 18 to the policy engine 36 and/or to the management API 40. Alternatively, the service programming interface 17 can retransmit the communication to the event mapping engine 30 which then communicates the communication to the policy engine 36 and/or management API 40.

Alternatively, the management API 40 can sit adjacent to the service programming interface 17 of the container application 16 and can be only configured to communicate directly with the policy engine 36. The management API 40 is not exposed via service programming interface 17, and as such is not accessible via pathways 18 (and thus 14). As a result, only the Policy Engine 36 can access the management API 40 exposed within the host container application 12.

In one example embodiment, for the Android platform, the management API 40 can be expressed as a set of Java interfaces 40 which the policy engine 36 is able to invoke directly via a Java method call. The container application 12 also contains a Launcher 42 providing a UI (e.g. Activity) component of the container application 12 that allows the user of the mobile device 10 to launch containerized applications 16 via the user interface 28. As such, the launcher 42 is exposed via the service programming interface 13 of the container application 12 and therefore is positioned behind the service programming interface 13 and as such only accessible via the pathways 18. In this manner, only external applications/processes (i.e. those outside of the service programming interface 13) that are authorized to communicate with the service programming interface 13 would have the opportunity to launch any of the target containerized applications 16 located behind the service programming interface 13.

Referring again to FIG. 3, the Event Mapping Engine 30 is considered a component (i.e. positioned behind the service programming interface 13 and thus only accessible by communications on pathways 18) of the Container Application 12 that can selectively expose service programming interfaces 17 of containerized applications 16 based on a set of event mappings 44. For example, in one embodiment on the Android platform, the onCreate( ) SPI 17 of Services can be exposed to the Android system (of the IPC device infrastructure 22) to control the creation and initialization of containerized application's 16 service. Suppose, by this example, the Policy Engine 36 applies a policy 38 where the containerized application 16 services are not to be created, nor initialized, until the user provides the proper credentials. This policy 38 can be expressed as an Event Mapping 44 of the form: ContainerApplication.unLock( ) R ~Service.onCreate( ) which has the meaning "ContainerApplication.unLock( ) has to occur before Sevice.onCreate( ) happens"

As such, the notion of a "sticky" method invocation can be introduced, denoted by the superscript sticky, which means that if the method invocation violates the temporal logic rule of the event mapping 44, the method invocation will be queued. Upon which the temporal logic rule is no longer violated the method invocation is restored. For example, if a call to Service.onCreate( ) could be intercepted if ContainerApplication.unLock( ) is false. If Service.onCreate( ) is sticky, the intercepted call can be resumed once ContainerApplication.unLock( ) becomes true. It is also recognized as an alternative that the expression of "sticky" property can be performed using logic as well.

In one embodiment on the Android platform, the Event Mapping Engine 30 can enforce a mapping rule 44 by: 1. Intercepting the call communication (e.g. Service.onCreate( )) invoked by the Android platform via byte-code manipulation of the service programming interface 13; 2. registering a listener to the ContainerApplication.unLock( ) event and the ConainerApplication.onCreate( ) event on the containerized application 16 (e.g. Service's) behalf; and 3. upon receiving the two events resume the Service.onCreate( ) invocation. As such, it is recognized in general that Event Mapping 44 rules can be expressed as a variant of temporal logic that are consumed by the Event Transformation Engine 30 to implement a policy 38 as directed by the Policy Engine 36.

Further to the above, in one embodiment for Android platform, the set of containerized applications 16 are associated with the container application 12 by defining metadata used to represent the containerized applications 16 as library projects of the host container application 12. An Android library project has all the components of a regular Android Project (e.g. Source code, resources, a manifest file etc.), except a regular Android project can establish a dependency on a library project by referencing the library project. The consequence of declaring this dependency between the library project and the application 16, is that the regular Android project, along with all library projects which it depends on, are compiled into a single Android apk and is treated as a monolithic application by the Android operating system at run-time. Further, a manifest of the containerized application 16 can be merged with the manifest of the container application 12, thus changing the "exported" attribute for Activities, Providers, Services and Receivers to false. This can provide for the establishment of the service programming interface 13 to operate as a virtual firewall between the containerized application 16 and the rest of the operating system (e.g. IPC device infrastructure 22). As discussed above, it is noted that the containerized application 16 can still communicate with each other using pathways 18 (e.g. via (but not limited to) Android binder) because they're inside the container application 16 (i.e. all are behind the service programming interface 13). It is also noted that pathway 18 can include direct (e.g. Java) method invocations, as desired The manifest of an application 12, 16 (e.g. an AndroidManifest.xml file with precisely that name in its root directory) presents information about the application to the operating system, information the operating system uses in order to execute the application 12, 16. Among other things, the manifest can provide any/all of the following: it names the (e.g. Java) package for the application such that the package name serves as a unique identifier for the application; it describes the components of the application—the activities, services, broadcast receivers, and content providers that the application is composed of; it names the parameters (e.g. classes) that implement each of the components and publishes their capabilities (for example, which Intent messages they can handle), for example these declarations can let the operating system (e.g. Android) know what the components are and under what conditions they can be launched; it determines which processes will host application components; it declares which permissions the application must have in order to access protected parts of the SPI/API and interact with other applications; it also declares the permissions that others are required to have in order to interact with the application's components; it lists the instrumentation classes that provide profiling and other information as the application is running, whereby these declarations are present in the manifest only while the application is being developed and tested;

they're removed before the application is published; it declares the minimum level of the operating system API that the application uses; and it lists the libraries that the application is linked against.

Further, the main activity (e.g. characterizing service) of each containerized application 16 is registered with the launcher 42, such that the launcher 42 can recognize and access the appropriate containerized application 16 upon invocation (or access request) resulting from communications coming from outside of the service programming interface 13 with a target as the respective containerized application 16. Further, based on the policies 38 that are to be applied to the containerized application(s) 16, a set of Event Mappings 44 is defined and expressed in a variation of temporal logic, to expose the subset SPI's 17 of the containerized application(s) 16 to the outside world (i.e. applications/processes located external to the SPI 13. For example, the policy "Service.onCreate( ) can't be invoked until container application 12 is unlocked. Upon which, Service.onCreate( ) that was suspended will be resumed" translates to ContainerApplication.unLock( ) R ~Service.onCreate( )sticky, as introduced above by example. Further, exposed is the subset SPI 17 of the containerized application(s) 16, as identified in the launcher 42 via the container application's 12 manifest.

Computer Device Example

For example, the device 10 can be a computing device 10 employed by a device user (e.g. a personal computing device). Examples of the device 10 can include such as but not limited to: a mobile device; a smart phone, a wireless phone; a PDA; a tablet; and/or a desktop computer. Accordingly, the computing device 10 can be connected to the network 11 via a wireless connection. Accordingly, the computing device 10 can be connected to the network 11 via a wired connection.

Preferably, the communications network 11 comprises a wide area network such as the Internet, however the network 11 may also comprise one or more local area networks 11, one or more wide area networks, or a combination thereof. Further, the network 11 need not be a land-based network, but instead may comprise a wireless network and/or a hybrid of a land-based network and a wireless network for enhanced communications flexibility. The communications network 11 is used to facilitate network interaction between the devices 10 and the servers (not shown).

Device Infrastructure 22

Referring again to FIG. 1, shown is an example device infrastructure 22 including the network connection interface 15, such as a network interface card (e.g. SIM) or a modem. The network connection interface 15 is connectable during operation of the devices 10 to the network 11 (e.g. an intranet and/or an extranet such as the Internet), which enables the devices 10 to communicate with each other as appropriate. The network 11 can support the communication of message 29, and the related content.

Referring again to FIG. 4, the device 10 can also have a user interface 28, coupled to the device infrastructure 22, to interact with a user (not shown). The user interface 28 can include one or more user input devices such as but not limited to a QWERTY keyboard, a keypad, a stylus, a mouse, a microphone and the user output device such as an LCD screen display and/or a speaker. If the screen is touch sensitive, then the display can also be used as the user input device as controlled by the device infrastructure 22.

Referring again to FIG. 1, operation of the device 10 is facilitated by the device infrastructure 22. The device infrastructure 22 includes one or more computer processors CPU and can include associated physical memory 24. The computer processor CPU facilitates performance of the device 10 configured for the intended task (e.g. of the respective module(s) of applications 12, 16) through operation of the network interface 15, the user interface 28 and other application programs/hardware of the device 10 by executing task related instructions. These task related instructions can be provided by the operating system, and/or software applications 12, 16 located in the memory 24, and/or by operability that is configured into the electronic/digital circuitry of the processor(s) CPU designed to perform the specific task(s). Further, it is recognized that the device infrastructure 22 can include a computer readable storage medium coupled to the processor CPU for providing instructions to the processor CPU and/or to load/update the instructions. The computer readable medium can include hardware and/or software such as, by way of example only, flash memory, optically readable medium such as CD/DVD ROMS, and memory cards. In each case, the computer readable medium may take the form of a small disk, hard disk drive, solid-state memory card, or RAM provided in the memory module 24. It should be noted that the above listed example computer readable mediums can be used either alone or in combination.

Further, it is recognized that the computing device 10 can include the executable applications 12, 16 comprising code or machine readable instructions for implementing predetermined functions/operations, for example. The processor CPU as used herein is a configured device and/or set of machine-readable instructions for performing operations as described by example above, including those operations as performed by any or all of the applications 12, 16, firmware and/or operating system. As used herein, the processor CPU may comprise any one or combination of, hardware, firmware, and/or software. The processor CPU acts upon information by manipulating, analyzing, modifying, converting or transmitting information for use by an executable procedure or an information device, and/or by routing the information with respect to an output device. The processor CPU may use or comprise the capabilities of a controller or microprocessor, for example. Accordingly, any of the functionality of the modules may be implemented in hardware, software or a combination of both. Accordingly, the use of a processor CPU as a device and/or as a set of machine-readable instructions is referred to generically as a processor/module for sake of simplicity.

Example Storage 24

In view of the above descriptions of storage 24 for the computer devices 10 (see FIG. 1) can be configured as keeping the stored data 32,34 in order and the principal (or only) operations on the stored data are the addition/amendment of, processing of, or removal of the stored data from storage 24 (e.g. FIFO, FIAO, etc.). For example, storage 24 can be a linear data structure for containing and subsequent accessing of the stored data and/or can be a non-linear data structure for containing and subsequent accessing of the stored data.

Further, storage 24 receives various entities such as data that are stored and held to be processed later. In these contexts, storage 24 can perform the function of a buffer, which is a region of memory used to temporarily hold data while it is being moved from one place to another (i.e. between applications/processes of the computer devices 10). Typically, the data is stored in the memory when moving the data between processes within/between one or more on-board devices. It is recognised that storage 24 can be implemented in hardware, software, or a combination thereof. The storage 24 is used in the network system 8 when there is a difference between the rate/time at which data is received and the rate/time at which the data can be processed (e.g. ultimately by the devices 10).

Further, it will be understood by a person skilled in the art that memory/storage 24 described herein is the physical place where data can be held in an electromagnetic or optical form for access by the computer processors/modules. There can be two general usages: first, memory is frequently used to mean the devices and data connected to the computer through input/output operations such as disk systems and other forms of storage not including computer memory and other in-computer storage such as flash memory. Second, in a more formal usage, memory/storage 24 has been divided into: (1) primary storage, which holds data in memory (sometimes called random access memory or RAM) and other "built-in" devices such as the processor's L1 cache, and (2) secondary storage, which holds data on disks, and other devices requiring input/output operations. Primary storage can be faster to access than secondary storage because of the proximity of the storage to the processor or because of the nature of the storage devices. On the other hand, secondary storage can hold much more data than primary storage. In addition to RAM, primary storage includes read-only memory (ROM), flash memory, and L1 and L2 cache memory. Devices that hold storage are collectively known as storage media 24.

Memory/storage 24 can also be defined as a physical electronic holding place for instructions and data that the computer's microprocessor can reach quickly. When the computer is in normal operation, its memory usually contains the main parts of the operating system and some or all of the application programs and related data that are being used. Memory is often used as a shorter synonym for random access memory (RAM) and/or flash memory. This kind of memory can be located on one or more microchips that are physically close to the microprocessor in the computer.

The invention claimed is:

1. A method of controlling on-device access using a set of stored instructions executed by a computer processor to perform the steps of:
   implementing a container application and sub-application on a computing device, wherein the container application is configured to manage the sub-application and the sub-application is defined by metadata as a library project of the container application;
   receiving a communication for the sub-application by a first service programming interface (SPI) of the container application, the communication sent by an on-device process over a first communication pathway of a device infrastructure of the computer device utilizing an inter-process communication (IPC) framework of the device infrastructure, the first communication pathway provided external to the first SPI;
   retransmitting the communication by the first SPI to a second SPI of the sub-application over a second communication pathway that bypasses the IPC framework, the second communication pathway internal to the first SPI;
   receiving a response to the communication by the first SPI from the second SPI over the second communication pathway; and
   directing the response to the on-device process over the first communication pathway.

2. The method of claim 1 further comprising the step of:
   receiving another communication for the sub-application by the first SPI over the first communication pathway; and
   denying access to the sub-application by inhibiting receipt of the another communication by the second SPI.

3. The method of claim 1, wherein the on-device process is another application provisioned on the device infrastructure.

4. The method of claim 1, wherein the on-device process is a process associated with a hardware component of the device infrastructure.

5. The method of claim 1 further comprising the steps of:
   use by the sub-application of a first portion of the second SPI to receive the communication via the second communication pathway and a second portion of the second SPI to communicate with a second sub-application using the second communication pathway, wherein the first portion is dedicated for providing inter-application communication between the first SPI and the second SPI and the second portion is dedicated for providing inter-application communication between the second SPI and a respective SPI of the second sub-application managed by the container application, the respective SPI also internal to the first SPI.

6. The method of claim 4, wherein the hardware component is an external network connection interface of the device infrastructure.

7. The method of claim 1, wherein the second communication pathway is implemented using shared memory regions of a storage device of the device infrastructure such that only the container application managing the sub-application and the sub-application have access to the shared memory region.

8. The method of claim 7, wherein reading and writing of the communication to the shared memory regions is performed by one or more memory based message threads.

9. The method of claim 1 further comprising the steps of:
   receiving a behavioural control communication by the first SPI via the first communication pathway;
   retransmitting the behavioural control communication to a policy engine located internal to the first SPI over the second communication pathway; and
   directing a policy communication between the sub-application and the policy engine over the second communication pathway based on the behavioural control communication received by the policy engine; wherein the policy engine provides a set of management policies on behalf of the container application for the sub-application.

10. The method of claim 1 further comprising the steps of:
    receiving a behavioural control communication by the first SPI via the first communication pathway;
    retransmitting the behavioural control communication to a management API located internal to the first SPI over the second communication pathway; and
    directing an application management communication between the sub-application and the management API over the second communication pathway based on the behavioural control communication.

11. The method of claim 10, wherein the management API is expressed by the sub-application and the management communication is sent by the policy engine.

12. The method of claim 1 further comprising the stem of:
    receiving a launch command by the first SPI over the first communication pathway;
    retransmitting the launch command via the second communication pathway to a launcher UI component provisioned on-device internal to the first SPI; and
    sending the launch command to the sub-application over the second communication pathway as a target of the launch command.

13. A non-transitory computer-readable storage medium comprising computer-executable instructions which, when executed by a processor, cause a computing device to perform a method of controlling on-device access, the method comprising:
- implementing a container application and a sub-application on a computing device, wherein the container application is configured to manage the sub-application and the sub-application is defined by metadata as a library project of the container application;
- receiving a communication for the sub-application by a first service programming interface (SPI) of the container application, the communication sent by an on-device process over a first communication pathway of a device infrastructure of the computer device utilizing an inter-process communication (IPC) framework of the device infrastructure, the first communication pathway provided external to the first SPI;
- retransmitting the communication by the first SPI to a second SPI of the sub-application over a second communication pathway that bypasses the IPC framework, the second communication pathway internal to the first SPI;
- receiving a response to the communication by the first SPI from the second SPI over the second communication pathway; and
- directing the response to the on-device process over the first communication pathway.

* * * * *